United States Patent [19]
Nath et al.

[11] Patent Number: 6,166,926
[45] Date of Patent: Dec. 26, 2000

[54] ZERO VOLTAGE SWITCHING POWER SUPPLY WITH BURST MODE

[75] Inventors: Gautam Nath, Olympia, Wash.; William Vincent Fitzgerald, Zionsville, Ind.

[73] Assignee: Thomson Licensing S.A., Boulogne Cedex, France

[21] Appl. No.: 09/481,040

[22] Filed: Jan. 11, 2000

[51] Int. Cl.[7] .................................................. H02M 3/335
[52] U.S. Cl. .................................................. 363/21; 363/97
[58] Field of Search ................................. 363/20, 21, 97, 363/126

[56] References Cited

U.S. PATENT DOCUMENTS

| | | | |
|---|---|---|---|
| 4,631,652 | 12/1986 | Wendt | 363/16 |
| 4,685,041 | 8/1987 | Bowman et al. | 363/40 |
| 4,845,605 | 7/1989 | Steigerwald | 363/21 |
| 5,146,395 | 9/1992 | McKie | 363/13 |
| 5,424,933 | 6/1995 | Illingworth | 363/21 |
| 5,559,478 | 9/1996 | Athas et al. | 331/117 FE |
| 5,608,613 | 3/1997 | Jansen | 363/21 |

*Primary Examiner*—Adolf Deneke Berhane
*Attorney, Agent, or Firm*—Joseph S. Tripoli; Joseph J. Laks; Sammy S. Henig

[57] ABSTRACT

In a tuned switch mode power supply, a supply inductance is coupled to a capacitance to form a tuned, resonant circuit. A transistor switch is coupled to the resonant circuit for generating current pulses in the inductance, coupled to a load circuit to provide an output of the power supply. Resonant voltage pulses are developed between a pair of main current conducting terminals of the transistor switch. A controller is coupled to the transistor switch for generating a switch control signal, during a run mode of operation. The transistor switch is turned on periodically, when the resonant voltage pulses reaches a zero voltage, to provide for zero voltage switching. The generation of the current pulses is disabled to provide for a burst mode operation, in a standby mode operation.

10 Claims, 4 Drawing Sheets

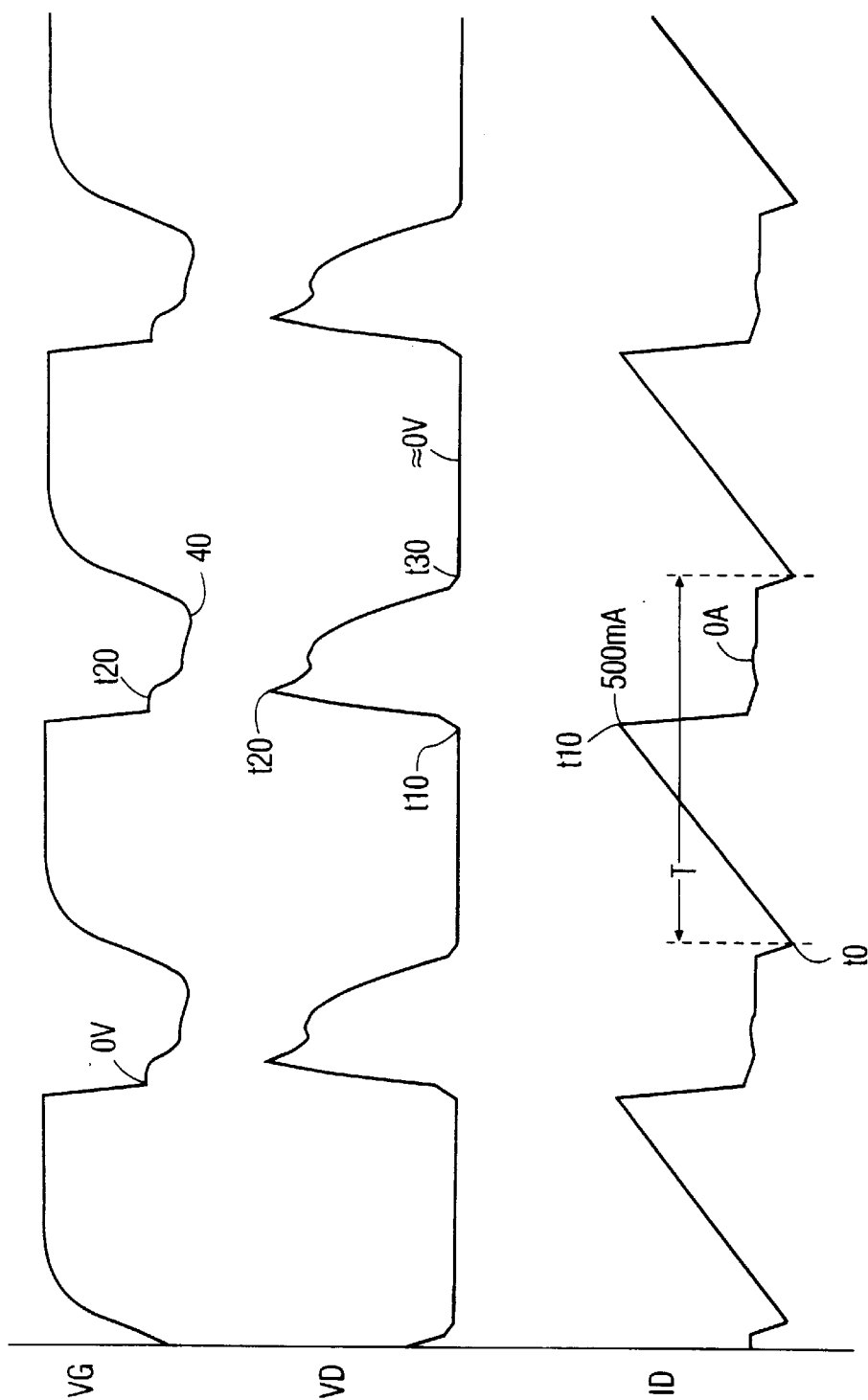

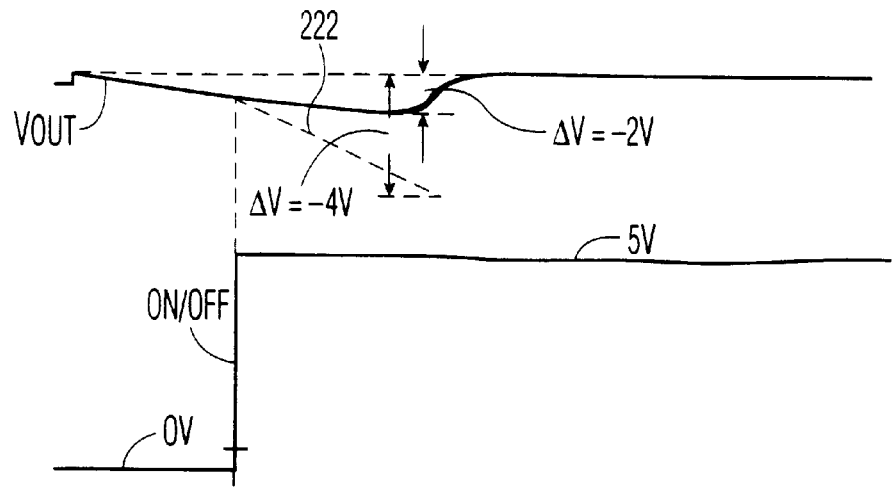
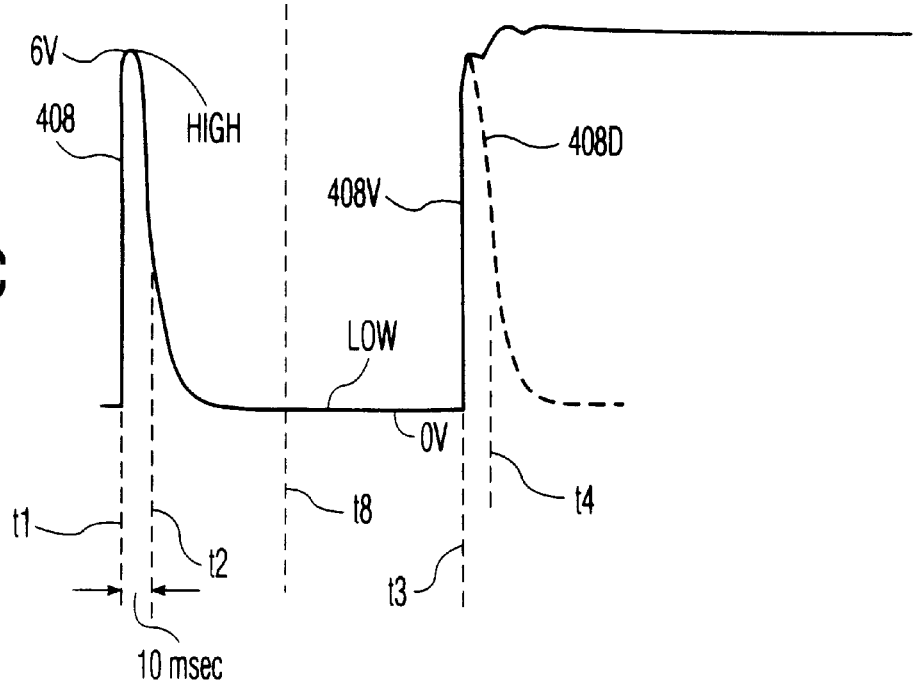

ZERO VOLTAGE SWITCHING POWER SUPPLY WITH BURST MODE

The invention relates to a zero voltage switching switch mode power supply having a burst mode operation and a run mode operation.

BACKGROUND

A typical switch mode power supply (SMPS) includes a switching transistor coupled to a primary winding of power transferring transformer for periodically applying an input supply voltage to the primary winding. It is known to operate the SMPS in a run mode of operation and in a standby mode of operation. During a run mode operation, pulses of current are developed in a secondary winding of the transformer at a high frequency and are rectified for periodically replenishing a charge in a filter or smoothing capacitor. An output supply voltage, developed in the capacitor, is connected to energize a load.

In the run mode of operation, the SMPS operates in a continuous mode. In the standby mode of operation, it may be desirable to operate the SMPS in a burst mode for reducing power dissipation. In a given cycle of the burst mode, the high frequency current pulses a are developed in the transformer windings. The current pulses are followed by a relatively long interval, referred to herein as dead time interval, of several milliseconds, in which no current pulse is produced. An advantageous type of a SMPS is a zero voltage switching SMPS.

In carrying out an inventive feature, in a zero voltage switching SMPS, switching on the transistor occurs when the voltage between the main current conducting terminals of the transistor is zero for minimizing switching losses. It may be desirable to operate the zero voltage switching SMPS in the burst mode, during standby.

In a zero voltage switching SMPS, embodying an inventive feature, the standby mode is initiated by disconnecting a run mode load from the filter capacitor via a switch. Thereby, the run mode load ceases consuming load current. Because the run mode load circuit is de-energized, a feedback loop of the SMPS causes the transistor to conduct in a substantially shorter duty cycle than in the run mode. The short duty cycle in successive switching cycles of the transistor causes the zero voltage switching SMPS to operate in a standby, burst mode.

SUMMARY

A switch mode power supply apparatus, embodying an aspect of the invention includes a supply inductance coupled to an input supply voltage source. A capacitance is coupled to the inductance to form a tuned, resonant circuit. A first transistor switch is coupled to the resonant circuit for generating energizing, supply pulses in the inductance that are coupled to a load circuit. In a given switching period, resonant voltage pulses are developed between a pair of main current conducting terminals of the first transistor switch. A switch control signal is generated to turn on the first transistor switch in the given switching period of the first transistor switch. In a run mode operation, the first transistor switch is turned on after a given one of the resonant voltage pulses has decreased to a level sufficient to provide for zero voltage switching. A source of an on/off control signal indicates when standby operation is required. The switch operates in burst mode, during standby.

BRIEF DESCRIPTION OF THE DRAWINGS

FIGS. 2a, 2b and 2c illustrate waveforms useful for explaining the operation of the circuit of FIG. 1, in the run mode;

FIGS. 4a, 4b, and 4c illustrate waveforms useful for explaining the operation of the circuit of FIG. 1 in a transition from the burst mode to the run mode.

DESCRIPTION OF THE PREFERRED EMBODIMENT

Figure 1:
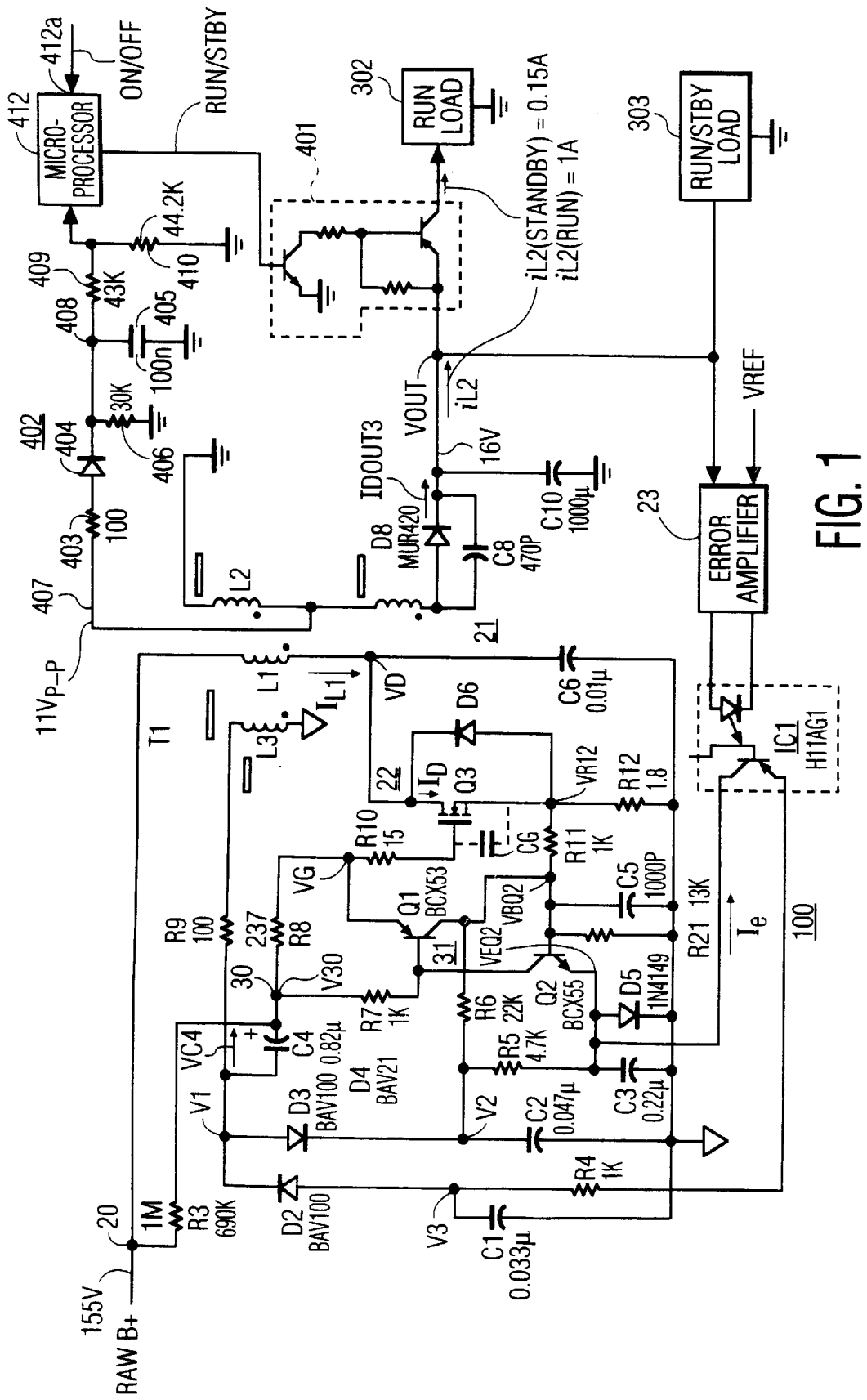
FIG. 1 illustrates a power supply, embodying an inventive feature, operating in a burst mode, during standby.

FIG. 1 illustrates a tuned SMPS 100, embodying an aspect of the invention. In FIG. 1, an N-type, metal oxide semiconductor (MOS) power transistor Q3 operating as a transistor switch has a drain electrode coupled through a primary winding L1 of a transformer T1 to a terminal 20 of an input supply, direct current (DC) voltage RAW B+. Transformer T1 serves as an isolation transformer for providing hot ground-cold ground isolation barrier. Voltage RAW B+ is derived from, for example, a filter capacitor coupled to a bridge rectifier that rectifies a mains supply voltage, not shown.

A source electrode of transistor Q3 is coupled to a non-isolated, hot ground1 via a current sensor or sampling resistor R12. A damper diode D6 operating as a switch is coupled in parallel with transistor Q3 and is included in the same package with transistor Q3 to form a bi-directional switch 22. Capacitor C6 is coupled in parallel with diode D6 and in series with winding L1 to form with an inductance of winding L1 a resonant circuit 21 when switch 22 is non conductive.

A secondary winding L2 of transformer T1 is coupled to an anode of a peak rectifying diode D8 and to an isolated or cold ground for generating an output voltage VOUT in a filter capacitor C10 that is coupled to a cathode of diode D8. Voltage VOUT is coupled to a run load circuit 302, during a run mode of operation, via a series coupled run load switch 401. Switch 401 is controlled by a control signal RUN/STBY, embodying an inventive feature, produced by a microprocessor 412 for maintaining switch 401 turned on, during the run mode.

An error amplifier 23 is responsive to voltage VOUT and to a reference voltage VREF. A photo-coupler IC1 includes a light emitting diode. An emitter electrode of the transistor of photo-coupler IC1 is coupled to a negative DC voltage V3 via a resistor R4. A collector electrode of the transistor of photo-coupler IC1 is coupled to capacitor C3. Opto-coupler IC1 serves for isolation. An error collector current Ie of the opto-coupler IC1 is indicative of an amount by which voltage VOUT is greater than reference voltage VREF and, thus, of the difference between them.

A comparator transistor Q2 has a base electrode that is coupled via a resistor R11 to a junction terminal between the source electrode of transistor Q3 and current sensor resistor R12. Transistor Q2 compares a base voltage VBQ2 of transistor Q2 to an error voltage VEQ2 developed at the emitter of transistor Q2. Voltage VBQ2 includes a first portion that is proportional to a source-drain current ID in transistor Q3. A DC voltage V2 is coupled via a resistor R6 to the base of transistor Q2 to develop a second portion of voltage VBQ2 across resistor R11.

DC voltage V2 is also coupled via a resistor R5 to a feedback loop filter formed by capacitor C3 to form a current source that charges capacitor C3. Error current Ie is coupled to capacitor C3 for discharging capacitor C3. A diode D5 is coupled between the emitter of transistor Q2 and ground. Diode D5 limits voltage VEQ2 to diode D5 forward voltage and limits the maximum current in transistor Q3.

The collector electrode of transistor Q2 is coupled to the base electrode of a transistor Q1 and the collector electrode of transistor Q1 is coupled to the base electrode of a transistor Q2 to form a regenerative switch 31. A control voltage VG of transistor Q3 is developed at the emitter of transistor Q1 that forms an output terminal of regenerative switch 31 and is coupled to the gate electrode of transistor Q3 via a resistor R10.

A secondary winding L3 of transformer T1 is coupled via a resistor R9 for producing an alternating current (AC) voltage V1. Voltage V1 is AC-coupled via a capacitor C4 and a resistor R8 to the emitter of transistor Q1 to generate drive voltage VG of transistor Q3. AC-coupled voltage V1 is coupled via a collector resistor R7 to the collector electrode of transistor Q2 and to the base electrode of transistor Q1. Voltage V1 is also rectified by a diode D2 to generate voltage V3 and by a diode D3 to generate voltage V2.

A resistor R3 coupled between the source of voltage RAW B+ and a terminal 30 of capacitor C4 that is remote from winding L3 charges capacitor C4 when voltage RAW B+ is turned on. When voltage VG on the gate electrode of transistor Q3 exceeds a threshold voltage of MOS transistor Q3, transistor Q3 conducts, causing a drain voltage VD of transistor Q3 to decrease. As a result, voltage V1 becomes positive and reinforces voltage VG for maintaining transistor Q3, in a positive feedback manner, fully turned on.

FIGS. 2a–2c illustrate waveforms useful for explaining the operation of tuned SMPS 100 of FIG. 1. Similar symbols and numerals in FIGS. 1 and 2a–2c indicate similar items or functions.

During an interval t0–t10 of a given period T of FIG. 2c, current ID of conductive transistor Q3 of FIG. 1 is up-ramping. Consequently, a corresponding non-resonant current pulse portion of a current IL1 in winding L1 is up-ramping and stores magnetic energy in the inductance associated with winding L1 of transformer T1. At time t10 of FIG. 2c, voltage VBQ2 of FIG. 1, containing an up-ramping portion derived from the voltage across resistor R12, exceeds a triggering level of regenerative switch 31 that is determined by voltage VEQ2 and turns on transistor Q2. Current flows in the base of transistor Q1. Therefore, regenerative switch 31 applies a low impedance at the gate electrode of transistor Q3. Consequently, gate electrode voltage VG of FIG. 2a is reduced to near zero volts and turns off transistor Q3 of FIG. 1. When transistor Q3 is turned off, drain voltage VD of FIG. 2b increases and causes voltage V1 of FIG. 1 that is coupled from winding L3 to decrease. The charge stored in gate-source capacitance CG maintains latch mode operation until time t20 of FIG. 2a.

When voltage VG becomes smaller than required to maintain sufficient collector current in transistor Q1 of FIG. 1, a forward conduction on the base electrode of transistor Q2 ceases and, consequently, latch operation mode in regenerative switch 31 is disabled. Afterwards, voltage V1 that continues to decrease causes a negative portion 40 of voltage VG of FIG. 2a to maintain transistor Q3 of FIG. 1 turned off.

When transistor Q3 is turned off, drain voltage VD increases as shown during interval t10–t20 of FIG. 2b. Capacitor C6 of FIG. 1 limits the rate of increase of voltage VD such that transistor Q3 is completely non conductive before voltage VD increases appreciably above zero voltage. Thereby, switching losses and radiated switching noise are, advantageously, reduced. Resonant circuit 21 that includes capacitor C6 and winding L1 oscillates, during interval t10–t30 of FIG. 2b, when transistor Q3 of FIG. 1 is turned off. Capacitor C6 limits the peak level of voltage VD. Therefore, advantageously, no snubber diode and resistor are needed so that efficiency is improved and switching noise is reduced.

The decrease in voltage VD prior to time t30 of FIG. 2b, causes voltage V1 of FIG. 1 to become a positive voltage. At time t30 of FIG. 2b, voltage VD is close to zero volts and slightly negative, causing damper diode D6 of FIG. 1 to turn on and to clamp voltage VD of FIG. 2b to approximately zero volts. Thus, resonant circuit 21 of FIG. 1 exhibits a half cycle of oscillation. After time t30 of FIG. 2b, voltage VG of FIG. 2a becomes increasingly more positive, because of the aforementioned change in polarity of voltage V1 of FIG. 1.

The following turn on of transistor Q3 is delayed by a delay time that is determined by the time constant of resistor R8 and gate capacitance CG until after time t30 of FIG. 2b when voltage VD is nearly zero volts. Therefore, minimal turn-on losses are incurred and switching noise is reduced.

Negative feedback regulation of voltage VOUT is achieved by varying voltage VEQ2 in filter capacitor C3. When Voltage VOUT is larger than voltage VREF, current Ie discharges capacitor C3 and decreases voltage VEQ2. Therefore, the threshold level of comparator transistor Q2 is decreased. Consequently, the peak value of current ID in transistor Q3 and the power delivered to the load circuit, not shown, are reduced. On the other hand, when voltage VOUT is smaller than voltage VREF, current Ie is zero and the current in resistor R5 increases voltage VEQ2. Consequently, the peak value of current ID in transistor Q3 and the power delivered to the load circuit, not shown, are increased. Thus, the control circuit of transistor Q3 that includes regenerative switch 31 provides duty cycle modulation of current ID in transistor Q3, in accordance with voltage VEQ2.

Tuned SMPS 100 operates in a current mode control, on a current-pulse by current-pulse control basis. The current pulse of current ID during interval t0–t10 of FIG. 2c, flowing in transistor Q3 of FIG. 1, terminates at time t10 of FIG. 2c when it reaches the threshold level of transistor Q2 of FIG. 1 that is determined by voltage VEQ2 and is established by error current Ie forming an error signal. The error signal actually controls the peak current of the current pulse of current ID that flows in the inductance of winding L1. The control circuit corrects instantaneously in a feed forward manner for input voltage variations of voltage B+ without using the dynamic range of error amplifier 23. In this way, both the advantages of current mode regulation and of tuned SMPS are obtained.

Figure 3A:
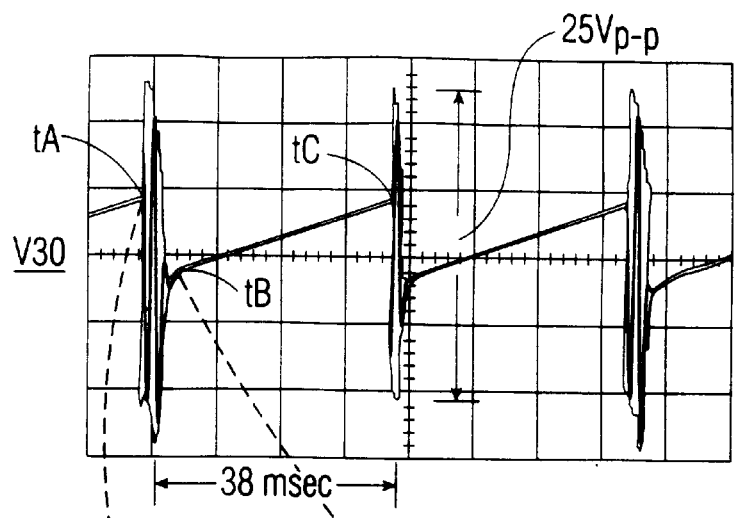
FIGS. 3a and 3b illustrate waveforms useful for explaining the operation of the circuit of FIG. 1, in the standby, burst mode.
Figure 3B:
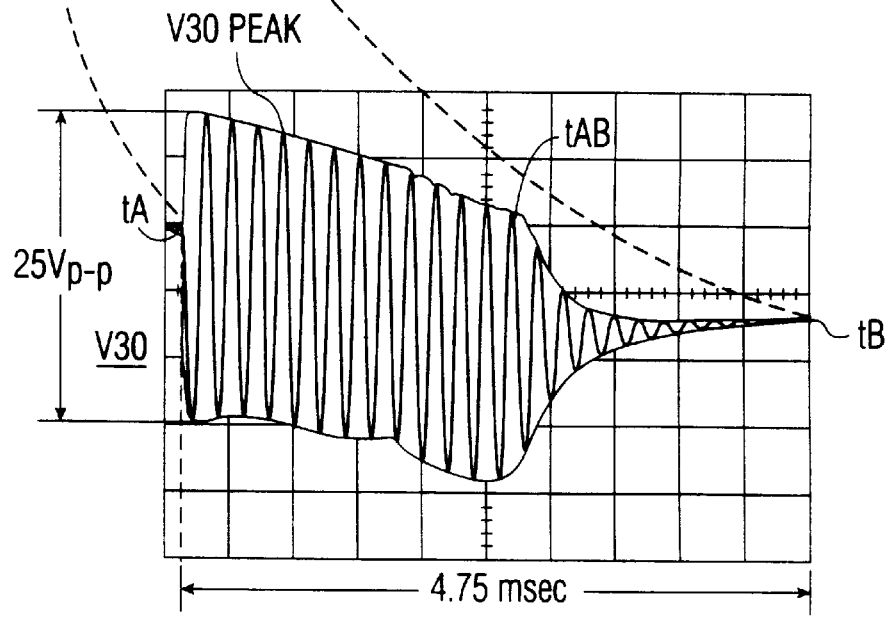

FIGS. 3a and 3b illustrate waveforms of a voltage V30 of FIG. 1 at terminal 30 useful for explaining the operation in a standby, burst mode of SMPS 100. When transistor Q3 is turned on, voltage V30 is approximately equal to gate voltage VG that controls transistor Q3. The waveform of voltage V30 of FIG. 3b includes a time expanded active interval tA and tB, when switching operations occur in transistor Q3 of FIG. 1, during a burst mode period tA–tC of FIG. 3a. During a relatively long dead time interval tB–tC, no switching cycles occur in transistor Q3 of of FIG. 1. Similar symbols and numerals in FIGS. 1, 2a, 2b, 2c, 3a and 3b indicate similar items or functions.

During a dead time interval that ends at time tA of FIG. 3b, capacitor C4 of FIG. 1 is charged in a ramping manner via resistor R3 at a rate determined by the R3, C4 time constant for developing a positive voltage VC4. At time tA, positive voltage V30 reaches a threshold level of transistor Q3 of FIG. 1. Consequently, high frequency switching cycles are produced in transistor Q3. During interval tA–tB, a positive peak voltage V30PEAK of voltage V30 of FIG. 3b exceeds the threshold level of transistor Q3 of FIG. 1. Therefore, the high frequency switching cycles continue in transistor Q3. In each switching cycle of transistor Q3, transistor Q1 is turned on, as explained before. Therefore, capacitor C4 is slightly discharged. The discharging current in transistor Q1 exceeds the charging current in resistor R3. Therefore, voltage VC4 is down-ramping. Voltage VC4 level shifts voltage V1 in a direction that tends to decrease positive peak voltage V30PEAK of FIG. 3b. At time tAB, positive peak voltage V30PEAK decreases to a value that is smaller than the threshold level of transistor Q3 of FIG. 1. Switching operation in transistor Q3 cease at time tB, and the next dead time interval. tB–tC follows. From time tB to time tC of FIG. 3a, capacitor C4 is charged via resistor R3, as explained before.

When, for example, a user initiates a power-off request command via, for example, a remote control arrangement, not shown, a control signal ON/OFF is applied to an input terminal 412a of microprocessor 412. Microprocessor 412 of FIG. 1 generates control signal RUN/STBY at a LOW state for turning off run load switch 401. Turned off switch 401 de-couples run mode load circuit 302 of FIG. 1 from filter capacitor C10 for initiating and maintaining standby, burst mode of operation. Thereby, load circuit 302 is de-energized and a load current iL2 in load circuit 302 ceases. On the other hand, load circuit 303 coupled to capacitor C10 includes stages that are energized, during the standby mode.

Capacitor C10 charging current IDOUT3 is small, when load circuit 302 is de-coupled. Because capacitor C10 charging current IDOUT3 of FIG. 1 is small when load circuit 302 is de-energized, the feedback loop causes transistor Q3 to conduct in a substantially shorter duty cycle than in the run mode. The short duty cycle in successive switching cycles of transistor Q3 produce standby, burst mode operation of SMPS 100.

In carrying out an inventive feature, SMPS 100 includes both the zero voltage switching feature, in the run mode, as explained before, and the burst mode feature, in the standby mode. Both features take advantage of the self oscillation feature of SMPS 100.

The values of resistor R3 and capacitor C4 are selected in accordance with the required length of dead time interval tB–tC. The value of resistor R8 is selected for insuring operation in the burst mode. If the value of resistor R8 were too large, the discharging current in transistor Q1 will be too small and the positive peak voltage V30PEAK of voltage V30 of FIG. 3b will not decrease below the threshold level of transistor Q3 of FIG. 1. Advantageously, by selecting sufficiently small value of resistor R8, burst mode operation is assured when short duty cycle occur in successive switching cycles of transistor Q3.

FIGS. 4a, 4b and 4b illustrate waveforms useful for explaining a transition from the standby mode to the run mode in SMPS 100 of FIG. 1. Similar symbols and numerals in FIGS. 1, 2a, 2b, 2c, 3a, 3b, 4a, 4b and 4c indicate similar items or functions. During a burst portion t1–t2 of FIG. 4c of a given burst mode cycle t1–t3, pulses 407 developed in winding L2 of FIG. 1 are rectified in an envelope detector 402 for developing an envelope detected pulse signal 408 in capacitor 405 of FIG. 1. Envelope detector 402 includes a resistor 403 coupled between a portion of winding L2 of transformer T1 and an anode of a rectifying diode 404. A cathode of diode 404 is coupled to a filter capacitor 405, coupled in parallel with a resistor 406. Pulses developed in winding L2 are rectified in diode 404 for developing envelope detected signal 408 in capacitor 405. Signal 408 is coupled via a voltage divider that includes a resistor 409 and a resistor 410 to microprocessor 412.

FIG. 4c illustrates the waveform of signal 408, during the standby mode and during a transition to the run mode. The transition to the run mode begins at time t3. Pulse signal 408 forms a logical level HIGH, outside a dead time interval t2–t3. During dead time interval t2–t3, burst mode pulses 407 of FIG. 1 are absent and signal 408 of FIG. 4c is at a logical LOW level.

When, for example, a user initiates a power-on request command via, for example, a remote control arrangement, not shown, control signal ON/OFF at the appropriate state is applied to input terminal 412a of microprocessor 412. Control signal ON/OFF of FIG. 4b may occur at a non-synchronized time with respect to signal 408 of FIG. 4c, for example, at time t8 of FIG. 4b, during dead time interval t2–t3. As a result, microprocessor 412 of FIG. 1 begins searching for an occurrence at time t3 of FIG. 4c of a LOW-to-HIGH transition 408U of envelope detected signal 408. Immediately after time t3 of FIG. 4c, microprocessor 412 of FIG. 1 generates synchronized control signal RUN/STBY at the HIGH state for turning on switch 401. It should be understood that the generation of synchronized control signal RUN/STBY can be alternatively accomplished using dedicated logic circuit responsive to envelope detected signal 408 and control signal ON/OFF. Such hardware solution can be used instead of generating signal RUN/STBY under program control in microprocessor 412.

Advantageously, switch 401 is turned on for coupling run mode load circuit 302 of FIG. 1 to filter capacitor C10 immediately after end time t3 of dead time interval t2–t3 of FIG. 4c. During a dead time interval portion t8–t3, when current pulses IDOUT3 of FIG. 1 are not produced, run mode load circuit 302 cannot discharge capacitor C10. Therefore, advantageously, output supply voltage VOUT of FIG. 1 does not decrease, during interval t8–t3 of FIG. 4a. In contrast, had switch 401 of FIG. 1 been turned on, during interval t8–t3 of FIG. 4b, voltage VOUT of FIG. 4a would have decreased significantly, as shown by a broken line 222 in FIG. 4a because of the absence of current pulses IDOUT3 of FIG. 1. Each current pulse IDOUT3 that occurs immediately after dead time interval t2–t3 of FIGS. 4a–4c replenishes filter capacitor C10 of FIG. 1. Thereby, advantageously, power supply start-up is facilitated.

Assume, for example, that a magnitude of load current iL2 in the burst mode portion at time t4 of FIG. 4c is insufficient to disable the burst mode operation after LOW-to-HIGH transition 408U of envelope detected signal 408 occurs. Consequently, a LOW-to-HIGH transition 408D of envelope detected signal 408 occurs and another burst mode cycle will follow.

Advantageously, microprocessor 412 will, advantageously, cause switch 401 to be turned off for the duration of a following dead time interval, not shown, that follows time t4 of FIG. 4c. As a result, discharging filter capacitor C10 of FIG. 1 is, advantageously, prevented. At the end of the dead time interval, not shown, that follows time t4 of FIG. 4c, when a following LOW-to-HIGH transition 408U, not shown, of envelope detected signal 408 occurs, the magnitude of load current iL2 of FIG. 1 may be sufficient to disable the burst mode operation. Consequently, SMPS 100 will continue operating in the continuous run mode. Thereby, advantageously, a second start-up attempt would be facilitated.

What is claimed is:

1. A switch mode power supply apparatus, comprising:

a source of an input supply voltage;

a supply inductance coupled to said input supply voltage source;

a capacitance coupled to said inductance to form a tuned, resonant circuit;

a first transistor switch coupled to said resonant circuit for generating energizing, supply pulses in said inductance that are coupled to a load circuit such that in a given switching period resonant voltage pulses are developed between a pair of main current conducting terminals of said first transistor switch;

means coupled to said first transistor switch for generating a switch control signal to turn on said first transistor switch in said given switching period of said first transistor switch, such that, in a run mode operation, said first transistor switch is turned on after a given one of said resonant voltage pulses has decreased to a level sufficient to provide for zero voltage switching;

a source of an on/off control signal that indicates when standby operation is required; and means responsive to said on/off control signal and coupled to said first transistor switch for operating said switch in burst mode, during standby.

2. A power supply according to claim 1, wherein said energizing pulses disabling means is responsive to a signal indicative of a magnitude of said energizing pulses for selectively disabling the generation of said energizing pulses in said first portion of said given cycle, when said magnitude of said energizing pulses in said second portion of said given cycle is within a range of values, and for selectively enabling continuous generation of said energizing pulses in said run mode, when said magnitude of said energizing pulses is outside said range of values.

3. A power supply according to claim 1, wherein said switch control signal generating means is responsive to said resonant voltage pulses for controlling when said first transistor switch is turned on.

4. A power supply according to claim 1 wherein said switch control signal generating means comprises, a duty cycle modulator for varying a duty cycle of said first transistor and wherein said energizing pulses disabling means is responsive to a signal that varies in accordance with a value of said duty cycle for operating said power supply in said run mode, when said duty cycle is within a range of values, and for operating said power supply in said standby, burst mode, when said duty cycle is outside said range of values.

5. A power supply according to claim 4 further comprising, a switch responsive to said on/off control signal for selectively coupling said energizing pulses to said load circuit to establish said run mode of operation and for selectively de-coupling said energizing pulses from said load circuit to establish said standby, burst mode of operation.

6. A power supply according to claim 1 wherein said energizing pulses disabling means comprises a second capacitance coupled to a control terminal of said first switching transistor, means coupled to said second capacitance for producing a first ramping voltage to control a length of a second portion of said given burst mode cycle, when said energizing pulses are generated, and means coupled to said second capacitance for producing a second ramping voltage to control a length of said first portion of said given burst mode cycle, when said energizing pulses are disabled.

7. A power supply according to claim 6 wherein said first ramping voltage generating means comprises a second switching transistor and said second ramping voltage generating means comprises a resistor.

8. A power supply according to claim 6 wherein said resonant voltage pulses are coupled via said second capacitance to said control terminal of said first switching transistor for turning on said first switching transistor, in said given switching period of said first transistor switch.

9. A switch mode power supply apparatus, comprising:

a source of an input supply voltage;

a supply inductance coupled to said input supply voltage source;

a first capacitance coupled to said inductance to form a tuned, resonant circuit;

a first transistor switch coupled to said resonant circuit for generating energizing pulses in said inductance coupled to a load circuit, and for generating resonant voltage pulses between a pair of main current conducting terminals of said first transistor switch;

a second capacitance for coupling said resonant voltage pulses to said first transistor switch for generating a switch control signal to turn on said first transistor switch in a given switching period of said first transistor switch, said first transistor switch being turned on, in a run mode operation, when a given resonant voltage pulse attains a zero voltage to provide for zero voltage switching;

a source of an on/off control signal that is indicative when operation in a standby, burst mode is required; and means responsive to said on/off control signal and coupled to said second capacitance for producing a first ramping voltage in said second capacitance to control a length of a first portion of a given cycle in said burst mode, when said energizing pulses are generating and for producing a second ramping voltage in said second capacitance to control a length of a second portion of said burst mode cycle, when said energizing pulses are disabled.

10. A power supply according to claim 9, wherein said ramping voltage producing means comprises a second switching transistor coupled to said second capacitance for producing said first ramping voltage and a resistor coupled to said input supply voltage source and to said second capacitance for producing said second ramping voltage.

\* \* \* \* \*